United States Patent [19]

Schmitt

[11] 4,420,699
[45] Dec. 13, 1983

[54] FREQUENCY TO VOLTAGE CONVERTER FOR A DIGITAL TACHOMETER

[75] Inventor: Walter Schmitt, Traunreut, Fed. Rep. of Germany

[73] Assignee: Dr. Johannes Heidenhain GmbH, Traunreut, Fed. Rep. of Germany

[21] Appl. No.: 363,475

[22] Filed: Mar. 30, 1982

[30] Foreign Application Priority Data

Apr. 16, 1981 [DE] Fed. Rep. of Germany ....... 3115497

[51] Int. Cl.$^3$ ......................... H03K 5/26; H03K 9/04
[52] U.S. Cl. .................................... 307/519; 307/529; 328/159; 324/83 A; 324/85
[58] Field of Search ........................ 328/158, 159, 166; 307/512, 515, 519, 529; 324/83 A, 85

[56] References Cited

U.S. PATENT DOCUMENTS

| 3,296,517 | 1/1967 | Routh et al. | 307/529 |
| 3,310,750 | 3/1967 | Hoffman | 328/159 |
| 3,803,425 | 4/1974 | Carp | 307/519 |
| 3,839,643 | 10/1974 | Lefevre et al. | 307/519 |

Primary Examiner—John S. Heyman
Attorney, Agent, or Firm—Willian, Brinks, Olds, Hofer, Gilson & Lione Ltd.

[57] ABSTRACT

A frequency-to-voltage converter for a digital tachometer is disclosed which is responsive to two measured signals generated by a rotational transducer. These two measured signals are applied to a direction discriminator which generates multiple pulse trains in response to the transducer. Each of these pulse trains has a frequency no less than that of the measured signals and the pulse trains are offset with respect to one another in phase angle. Each of the pulse trains is applied to a separate switching circuit which acts to generate a respective sequence of constant energy pulses. These sequences of constant energy pulses are summed in a summation amplifier and passed via a low pass filter to one input of a differential amplifier. The other input of the differential amplifier is coupled to the direction discriminator by a similar sequence of switching circuits, a summation amplifier, and a low pass filter. The output signal of the differential amplifier is proportional to the rotational velocity sensed by the transducer.

9 Claims, 3 Drawing Figures

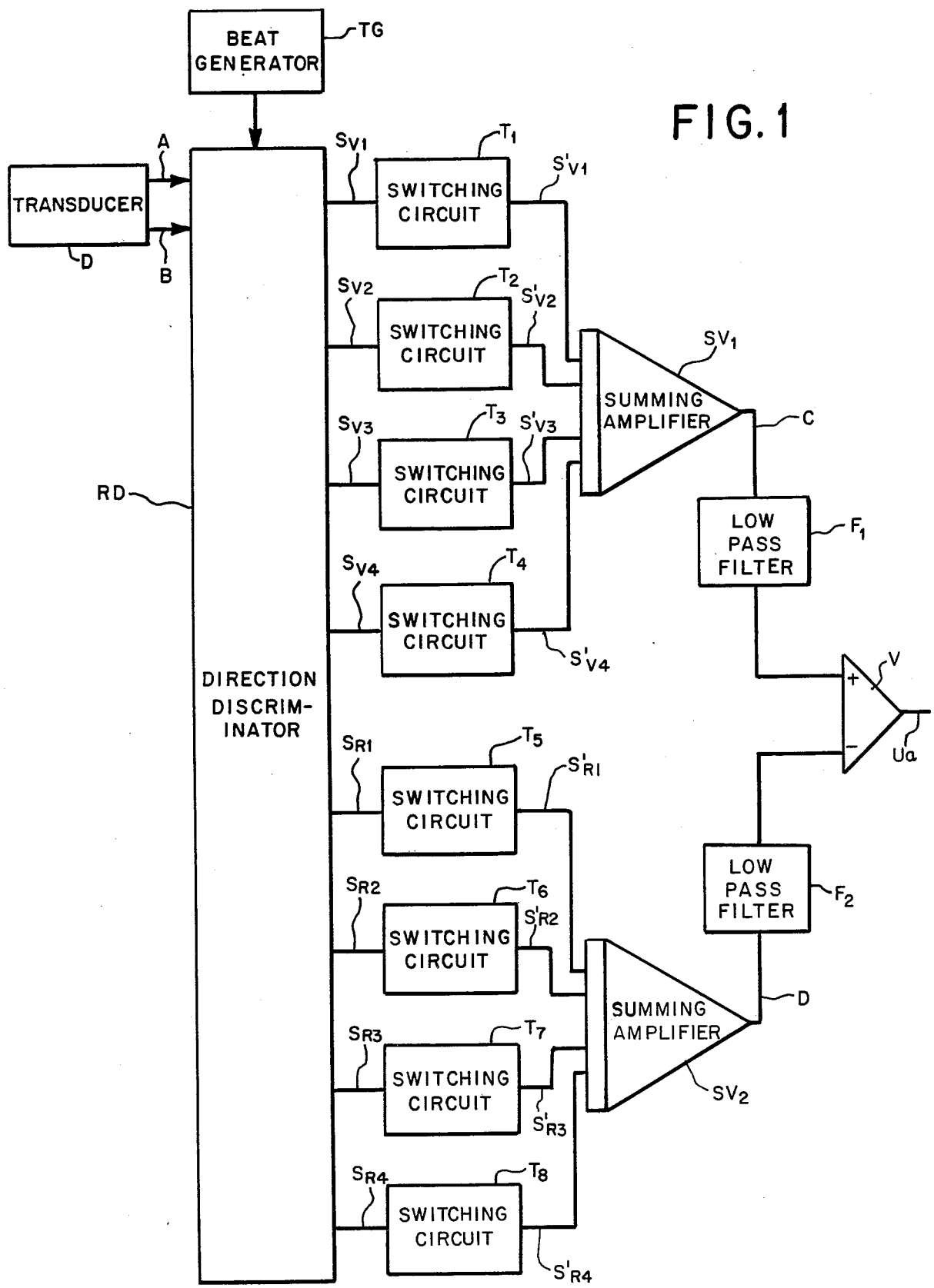

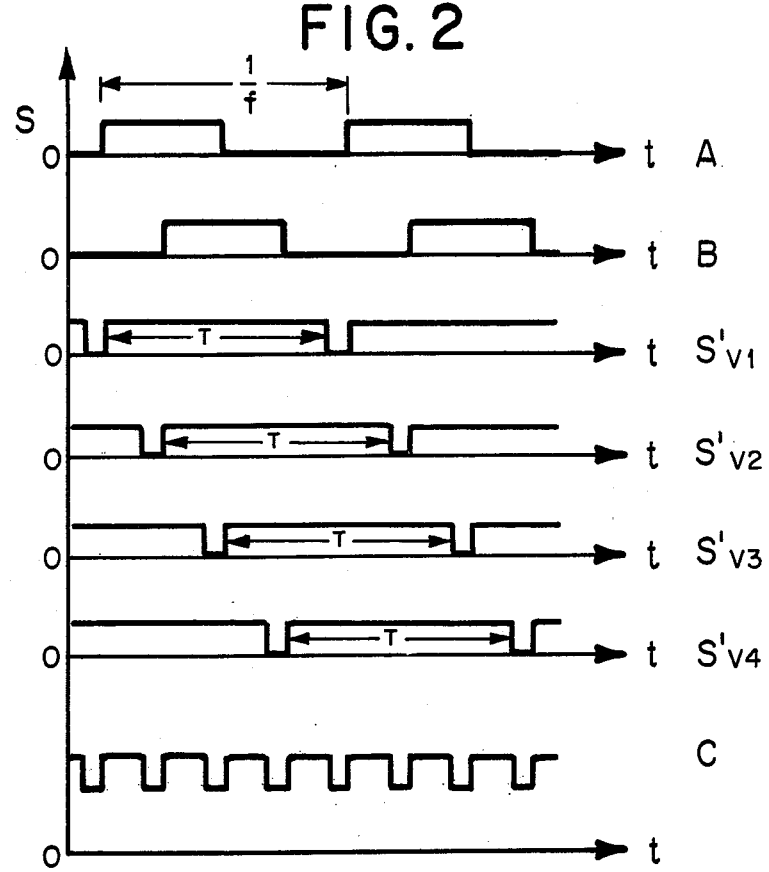
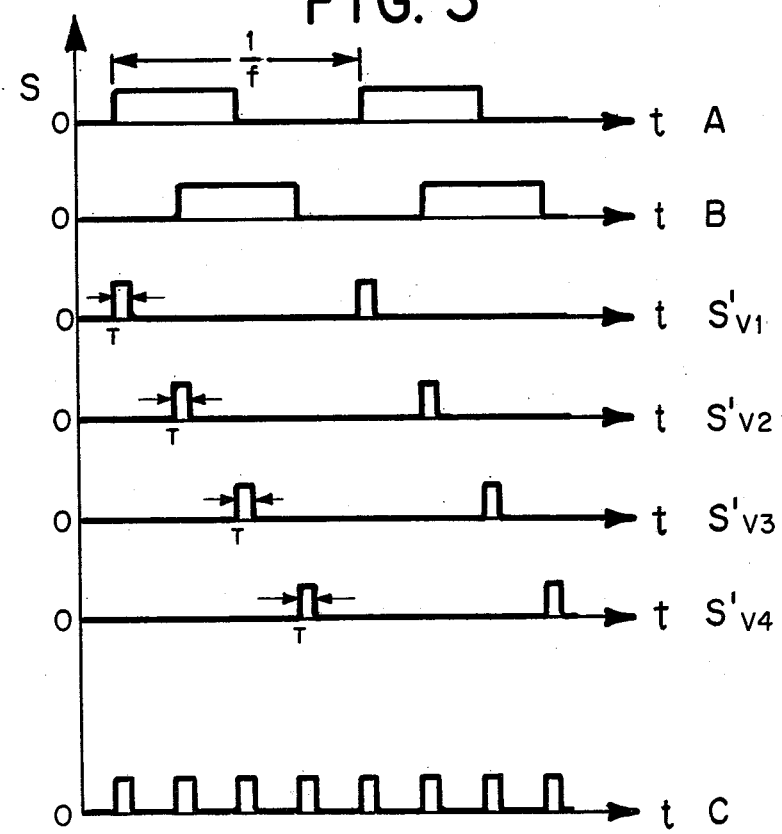

FREQUENCY TO VOLTAGE CONVERTER FOR A DIGITAL TACHOMETER

BACKGROUND OF THE INVENTION

This invention relates to an improved frequency to voltage converter for a digital tachometer of the type used in connection with an incremental measuring system which generates at least two periodic, phase shifted measured signals in response to the relative movement of a first object with respect to a second object.

Tachometers of the type which include direct current tachogenerators that operate to generate signals indicative of rotational velocity according to the dynamo principle are known to the art.

It is also a known practice to provide a digital tachometer which utilizes an incremental rotation transducer which generates two measured signals. These two measured signals are periodic and offset with respect to one another by 90°. They are applied to a direction discriminator circuit which responds to the phase relationship between the two measured signals to generate two pulse trains, a forward pulse train and a backward pulse train. Each of these two pulse trains is applied to a respective switching circuit which generates a sequence of constant energy pulses in response to the associated pulse train. Each sequence of constant energy pulses is filtered by a low pass filter, and the two filtered sequences of pulses are applied to the two inputs of a differential amplifier. The output signal of this differential amplifier is proportional to the rotational velocity sensed by the rotation transducer.

The usable frequency range of such a circuit is limited at high frequencies by the time duration of the constant energy pulses. At low frequencies, the usable frequency range is limited by the maximum allowable periodic component in the output signal of the differential amplifier, which is determined by the time constant of the low pass filters. If the direction discriminator is designed to provide multiple output signals for each cycle of the rotation transducer, and all of these output signals are applied to a single switching circuit, the usable frequency range is shifted, but it is not increased.

SUMMARY OF THE INVENTION

The present invention is directed to an improved frequency to voltage converter for use in a digital tachometer which provides an extended usable frequency range.

According to this invention, a frequency to voltage converter is provided for use with an incremental measuring system of the type which generates at least two periodic phase shifted measured signals. This converter comprises direction discriminator means responsive to the measured signals for simultaneously generating at least two pulse trains in response to the measured signals, the at least two pulse trains each having a frequency corresponding to and no less than that of the measured signals and phase shifted relative to one another. At least two switching means are provided, each of which is coupled to the discriminator means to receive a respective one of the pulse trains and to generate in response thereto a sequence of constant energy pulses. The constant energy pulses from the at least two switching means are combined to generate a composite signal which is passed through a low pass filter and applied to an amplifier. In alternate embodiments, the direction discriminator can either be of the type which generates forward pulse trains and backward pulse trains on separate terminals, or it can be of the type which generates a direction signal indicative of the phase relationship between the at least two measured signals and at least two pulse trains which are generated when the measured signals are indicative of forward or reverse rotation.

An important advantage of this invention is that the usable frequency range of the frequency to voltage converter can be extended to lower frequencies by the factor of the multiple evaluation. For example, in the following preferred embodiment, four separate pulse trains, each offset by a phase angle of 90°, are generated in response to forward rotation of the rotational transducer, and the usable frequency range is extended to lower frequencies by a factor of 4. All of these advantages are obtained by simple means which are relatively inexpensive to implement and reliable in operation. Further advantageous features of the invention are set out in the dependent claims.

The invention itself, together with further objects and attendant advantages, will best be understood by reference to the following detailed description taken in conjunction with the accompanying drawings.

BRIEF DESCRIPTION OF THE DRAWINGS

FIG. 1 shows a schematic diagram of a first preferred embodiment of the frequency to voltage converter of this invention.

FIG. 2 is a graphic representation of wave forms generated by the embodiment of FIG. 1 at the upper frequency limit of operation. FIG. 3 is a graphic representation of the wave forms generated by the embodiment of FIG. 1 at the lower frequency limit of operation.

DETAILED DESCRIPTION OF THE PRESENTLY PREFERRED EMBODIMENTS

Turning now to the drawings, FIG. 1 shows a schematic diagram of a first preferred embodiment of this invention. As shown in FIG. 1 this embodiment processes two measured signals A,B generated by a rotation transducer D. These two signals A,B are periodic signals which are displaced with respect to one another by a phase angle of 90°, such that the relative phasing of the two signals A,B unambiguously indicates the direction of rotation being sensed by the transducer D. The two measured signals A,B are applied to a direction discriminator RD. This direction discriminator serves to generate four forward output signals $S_{V1}$-$S_{V4}$ and four backward output signals $S_{R1}$-$S_{R4}$. Each of these output signals is generated at a respective terminal. Each of the output signals of the direction discriminator has an instantaneous frequency equal to that of the measured signals A,B. The four forward output signals $S_{V1}$-$S_{V4}$ are generated at phase angles of 0°, 90°, 180° and 270°, respectively. Similarly, the four backward ouput signals $S_{R1}$-$S_{R4}$ are generated at phase angles of 0°, 90°, 180°, and 270°, respectively. Thus, both the forward output signals $S_{V1}$-$S_{V4}$ and the backward output signals $S_{R1}$-$S_{R4}$ correspond to multiple evaluation of the measured signals A,B with a factor of 4. Each of the output signals $S_{V1}$-$S_{V4}$ and $S_{R1}$-$S_{R4}$ is applied to a respective switching circuit $T_1$-$T_8$. Each of these switching circuits $T_1$-$T_8$ acts to generate a respective output pulse $S'_{V1}$-$S'_{V4}$, $S'_{R1}$-$S'_{R4}$ of constant energy in response to an input pulse; that is, the output pulses generated by the switching circuits $T_1$-$T_8$ have a predetermined time duration T and a predetermined voltage S. The variation in time of the output signals $S'_{V1}$-$S'_{V4}$, $S'_{R1}$-$S'_{R4}$ of the switching circuits $T_1$-$T_8$ are represented in FIGS. 2 and 3. It should be understood that FIGS. 2 and 3 could have been graphed in terms of current and time rather than voltage and time. The sequences of constant energy pulses generated by the switching circuits $T_1$-$T_4$ are summed in a summing amplifier $SV_1$ to generate a composite signal C. This composite signal C is filtered via a low-pass filter $F_1$, and the filtered signal is applied to the noninverting input of a differential amplifier V. The sequences of constant energy pulses $S'_{R1}$-$S'_{R2}$ of the switching circuits $T_5$-$T_8$ are combined in a summing amplifier $SV_2$ to generate a composite signal D. This composite signal D is filtered by a low pass filter $F_2$, and the filtered resulting signal is applied to the inverting input of the differential amplifier V. The differential amplifier V acts to generate an output signal $U_a$ which is proportional to the frequency of the measured signals A,B, and therefore to the rotational velocity sensed by the rotational transducer D. By using four separate switching circuits $T_1$-$T_4$ for the forward pulses and four separate switching circuits $T_5$-$T_8$ for the backward pulses, the usable frequency range of this frequency to voltage converter is extended by a factor of 4 towards lower frequencies.

Turning now to FIG. 2, it can be seen that the measured signals A,B are periodic digital signals which are phase shifted by 90° with respect to one another. The sequences of constant energy pulses $S'_{V1}$ through $S'_{V4}$ are each shown as being staggered by a phase angle of 90°. The composite signal C is the summation of the four sequences of constant energy pulses $S'_{V1}$ through $S'_{V4}$. FIG. 2 represents the operation of the embodiment of FIG. 1 at the upper frequency limit of operation. The frequency of the measured signals A,B is denoted by the symbol f and the time duration of the constant energy pulses $S'_{V1}$-$S'_{V4}$ by the symbol T.

FIG. 3 represents the operation of the embodiment of FIG. 1 at the lower frequency limit of operation. In FIG. 3, the time scale has been reduced in order to allow the representation of at least 1-½ cycles of the measured signals A,B. Thus, the constant energy areas of each of the constant energy pulses, which areas are equal to the duration of the pulse T multiplied by the voltage of the pulse S, are equal in the two figures, FIG. 2 and FIG. 3.

At the upper frequency limit of operation the rotational velocity sensed by the rotation transducer D is proportional to the frequency f of the measured signals A,B. This frequency f at the upper frequency limit is equal to 1/1.1T. At the lower frequency limit shown in FIG. 3 this frequency f is equal to 1/16T. The output signal $U_a$ of the differential amplifier V is proportional to the frequency f of the measured signals A,B generated by the transducer D: $U_a = S \times T \times f$. When the transducer D senses rotation in the reverse direction, the direction discriminator RD generates signals on lines $S_{R1}$-$S_{R4}$ rather than $S_{V1}$-$S_{V4}$ and it is these backward signals $S_{R1}$-$S_{R4}$ which are evaluated.

In an alternate embodiment of this invention which is not shown in the drawings, the measured signals A,B of a transducer are applied to a direction discriminator of the type which includes means for generating a direction signal which is indicative of the phase relationship between the measured signals A,B. This direction discriminator generates output signals similar to $S_{V1}$-$S_{V4}$ except that the same signals are generated regardless of the direction of rotation sensed by the transducer D. Each of the four output signals of this alternate direction discriminator is fed to a respective switching circuit such that four sequences of constant energy pulses are generated. These four sequences of constant energy pulses are summed in a summation amplifier and passed via a low pass filter to an amplifier of the type having a polarity input terminal for controlling the polarity of the amplification of the amplifier. This polarity input terminal is connected to the direction signal generated by the direction discriminator such that the polarity of the amplifier is controlled by the direction discriminator. In this way, the amplifier can be made to generate positive output signals in response to forward rotation and negative output signals in response to negative rotation.

The switching circuits $T_1$ through $T_8$ are preferably constructed as CMOS circuits. Furthermore, the direction discriminator RD and the switching circuits $T_1$ through $T_8$ may be built up as a single integrated circuit having a plurality of logic gates. Also, it should be understood that the direction discriminator RD can be implemented as a programmable read-only memory.

The differential amplifier V and the amplifier in the alternative embodiment discussed above can be designed either as voltage sources or as current sources. The current source approach has the advantage that off-set voltages of the tachometer have no error effects, and thereby even with relatively small supply voltages, large dynamic ranges of measurable rotational velocity (in the range of 1 to 6,000) are made possible. The accuracy of the operation of the direction discriminator RD can be established by means of a beat generator TG which acts on the direction discriminator RD to fix the duration of the predetermined time interval T.

It should be understood that various changes and modifications to the preferred embodiments described above will be apparent to those skilled in the art. For example, a greater or lesser number of evaluations per cycle of the measured signals A,B can be made. It is, therefore, intended that the foregoing detailed description be regarded as illustrative rather than limiting. It is the following claims, including all equivalents, which are intended to define the scope of this invention.

I claim:

1. A frequency-to-voltage converter for use with an incremental measuring system of the type which generates at least two periodic measured signals, said converter comprising:

direction discriminator means, responsive to the measured signals, for generating at least two forward pulse trains and at least two backward pulse trains in response to the phase relationship between the measured signals, the at least two forward pulse trains each having a frequency corresponding to and no less than that of the measured signals and phase shifted with respect to one another, the at least two backward pulse trains each having a frequency corresponding to and no less than that of the measured signals and phase shifted with respect to one another;

at least two first switching means, each coupled to the discriminator means to receive a respective one of the forward pulse trains, for generating a sequence of constant energy pulses in response to the respective pulse train;

at least two second switching means, each coupled to the discriminator means to receive a respective one of the backward pulse trains, for generating a sequence of constant energy pulses in respose to the respective pulse train;

means for combining the sequences of constant energy pulses from the first switching means to generate a first composite signal;

means for combining the sequences of constant energy pulses from the second switching means to generate a second composite signal;

a differential amplifier having two input terminals and an output terminal;

means for passing low frequency components of the first composite signal to the first input terminal; and means for passing low frequency components of the second composite signal to the second input terminal.

2. A frequency-to-voltage converter for use with an incremental measuring system of the type which generates at least two periodic phase shifted measured signals, said converter comprising:

direction discriminator means, responsive to the measured signals, for simultaneously generating at least two pulse trains, each having a frequency corresponding to and no less than that of the measured signals and phase shifted with respect to one another;

at least two switching means, each coupled to the discriminator means to receive a respective one of the pulse trains for generating a sequence of constant energy pulses in response to the respective pulse train;

means for combining the sequences of constant energy pulses to generate a composite signal;

an amplifier having an input terminal and an output terminal; and means for passing low frequency components of the composite signal to the input terminal.

3. The invention of claim 1 or 2 wherein each of the switching means comprises a respective CMOS circuit.

4. The invention of claim 1 or 2 wherein the discriminator means and the switching means are combined in a single integrated circuit including a plurality of logic gates.

5. The invention of claim 1 or 2 wherein the discriminator means comprises a programmable read only memory.

6. The invention of claim 1 or 2 comprising timer means for generating a periodic sequence of timer pulses of predetermined frequency and means for supplying the periodic sequence of timer pulses to the discriminator means.

7. The invention of claim 1 or 2 wherein the amplifier operates as a voltage source.

8. The invention of claim 1 or 2 wherein the amplifier operates as a current source.

9. The invention of claim 2 wherein the direction discriminator means further comprises means for generating a direction signal, indicative of the phase relationship between the at least two measured signals, and wherein the amplifier further comprises:

means, responsive to a polarity input signal on a polarity terminal, for controlling the polarity of amplification between the input and output terminals; and means for passing the direction signal to the polarity terminal as a polarity input signal to control the polarity of the amplification of the amplifier.

* * * * *